United States Patent
Marechal et al.

(10) Patent No.: US 9,193,122 B2
(45) Date of Patent: Nov. 24, 2015

(54) SOLID DECK BEAD LOCK DRUM

(75) Inventors: Frederic Marechal, Athus (BE); Thierry Royer, Frassem (BE); Jean Marie Colling, Marbehan (BE); Olivier Di Prizio, Hettange Grande (FR); Wolfgang Buerling, Bollendorf (DE); Olivier Lescaud, Bastogne (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 497 days.

(21) Appl. No.: 13/244,992

(22) Filed: Sep. 26, 2011

(65) Prior Publication Data

US 2013/0075041 A1    Mar. 28, 2013

(51) Int. Cl.
*B29D 30/24*    (2006.01)
*B29D 30/36*    (2006.01)

(52) U.S. Cl.
CPC ........... *B29D 30/245* (2013.01); *B29D 30/246* (2013.01); *B29D 30/36* (2013.01)

(58) Field of Classification Search
CPC .... B29D 30/12; B29D 30/244; B29D 30/245; B29D 30/246; B29D 30/24; B29D 30/36; B29D 2030/2657; B29D 2030/3214
USPC .................. 156/414, 415, 417–420; 411/555
See application file for complete search history.

(56) References Cited

U.S. PATENT DOCUMENTS

| | | | | |
|---|---|---|---|---|
| 2,506,953 A | * | 5/1950 | Dzus | 411/555 |
| 3,346,434 A | * | 10/1967 | Fulton | 156/415 |
| 3,654,025 A | * | 4/1972 | Winzer et al. | 156/415 |
| 3,769,856 A | * | 11/1973 | Casey | 475/2 |
| 3,795,564 A | * | 3/1974 | Mallory | 156/417 |
| 3,867,231 A | * | 2/1975 | Casey | 156/415 |
| 4,214,939 A | | 7/1980 | Enders | |
| 4,402,783 A | | 9/1983 | Enders | |
| 5,164,035 A | * | 11/1992 | Nakajima et al. | 156/415 |
| 5,181,982 A | | 1/1993 | Kumagai | |
| 5,354,404 A | * | 10/1994 | Benjamin | 156/362 |
| 5,770,004 A | | 6/1998 | Ogawa | |
| 6,880,603 B2 | | 4/2005 | Akiyama | |
| 2006/0137806 A1 | | 6/2006 | Roedseth | |
| 2009/0056879 A1 | * | 3/2009 | Painter | 156/415 |

FOREIGN PATENT DOCUMENTS

| | | | |
|---|---|---|---|
| CN | 101186113 | | 5/2008 |
| CN | 101642964 | | 2/2010 |
| EP | 0206693 | | 12/1986 |
| JP | 2002-326288 A | * | 11/2002 |
| JP | 2003-118011 A | * | 4/2003 |
| JP | 2003118011 | | 4/2003 |
| JP | 2004074647 | | 3/2004 |
| JP | 2007331264 | | 12/2007 |
| JP | 2010083117 | | 4/2010 |

* cited by examiner

*Primary Examiner* — Geoffrey L Knable
(74) *Attorney, Agent, or Firm* — David L. King

(57) ABSTRACT

A rotatable tire building drum 10 has a pair of axially and radially moveable bead locks 20 and a radially expandable center building deck assembly 40 with two sets of deck plates when expanded forms a 360 degree solid deck surface. The deck plates have been sized to abut when fully expanded to form a solid 360 degree building surface to support a tire carcass 2. The two sets of deck plates are divided into a first set of even deck plates and a second set of odd deck plates, arranged in a sequence of at least 6 or more circumferentially adjacent abutting deck plates 1, 2, 3, 4, 5, 6 in an expanded state. In a retracted state, the first set of even deck plates 42 moves radially inward of the second set of odd deck plates 44, the first set 42 underlying the second set 44.

11 Claims, 18 Drawing Sheets

SOLID DECK BEAD LOCK DRUM

TECHNICAL FIELD

This invention relates to a tire building drum for use in applying the belt reinforcing structure and tread onto an unvulcanized tire carcass.

BACKGROUND OF THE INVENTION

Tire building drums for applying a tread and belt package onto a tire carcass are well known in the art. The tire building process generally has a stage one assembly of a tire carcass made of air impervious inner layer, a pair of beads, an apex and a reinforcing ply extending between and wrapping around the beads to form ply turnups. This unvulcanized structure also has sidewall rubber and outer rubber components such as gum strips, chafers or chipper added to the cylindrically shaped green carcass.

In a second stage, the green or uncured cylindrical carcass is taken to a separate tire building drum wherein the beads are locked onto the drum moved axially to a proper bead width spacing and the carcass is toroidaly shaped by expanding the carcass using an inflatable bladder which allows the carcass to assume a shape more closely approximating a finished tire. At this point, belt or breaker reinforcements such as steel cord reinforcement belts are applied onto the carcass. Typically the adjacent belt layers have the cords oppositely oriented. Once the belt structure is applied, a layer of tread rubber is added to complete the assembly.

These building drums are as described in US 2006/0137806 capable of moving the center section radially outward while moving the beads axially inwardly. In "Method Of Making A Tire Using A High Crown Uni-Stage Building Drum", the inventors proposed building a tire using a single drum assembly which allowed the ply turnup to be made as the tire ply was held vertically in the bead regions. This machine while exhibiting a good degree of novelty, added much complexity to the tire building as it required special means to clamp the tire shoulders to secure the carcass on assembly. Furthermore, it added significant cost to the apparatus.

The present invention described hereafter attempts to solve the problems of high complexity by providing a unique second stage tire building drum which allows a relatively small tire carcass having a large diameter to be made. More particularly, a machine specifically adapted to construct motorcycle tires of a diameter of 16 inches, 16.5 inches and 17 inches of different axial bead widths. This type of tire is very small in cross-sectional profile and this means there is very little room for the mechanical parts of the building machine to be located. Nevertheless, such tires require precise building capability and superior solid building surfaces would allow the tire to be made of the highest quality. The present invention solid deck building drum provides this ability as described below.

SUMMARY OF THE INVENTION

A rotatable tire building drum has a pair of axially and radially moveable bead locks and a radially expandable center building deck assembly which when expanded forms a 360 degree solid deck surface. The tire building drum has a shaft housing, onto which a pair of axially moveable and radially expandable bead locks for holding and securing a pair of beads of a green or unvulcanized tire is supported and a center radially expandable and retractable building deck assembly positioned axially between the bead locks and also supported on the shaft housing. The building deck assembly has two sets of deck plates. The deck plates have been sized to abut at a fully expanded diameter to form a solid 360 degree building surface to support a tire carcass at a specified diameter. The two sets of deck plates are divided into a first set of even deck plates and a second set of odd deck plates, arranged in a sequence of at least 6 or more circumferentially adjacent abutting deck plates 1, 2, 3, 4, 5, 6 in an expanded state. The number in the sequence defines whether a deck plate is even or odd. In a retracted state, the first set of even deck plates move radially inward of the second set resulting in a contracted position radially inward of the second set. The first set underlies the second set when retracted. The building drum has a main center shaft internal of the shaft housing which is connected to the bead locks. The main center shaft has two opposing ends, a first left end having a left screw pitch and a second right end having a right screw pitch, rotation of the main center shaft equally moves both the bead locks axially inwardly or outwardly. The building drum further has two pairs of diametrically opposed deck shafts internally mounted in the shaft housing, including a first pair of drive shafts having two first shafts aligned 180 degrees apart for moving the even deck plates, a second pair of two second shafts aligned 180 degrees apart each second shaft being between two first shafts, the second shafts for moving the odd deck plates. The shaft housing is cantilevered at one end mounted to a motor housing and the motor housing includes three independent motors, a first motor for rotating the main center shaft; a second linear motor for moving the two first deck shafts and a third linear motor for driving the two second drive shafts.

Each deck plate is formed as an arcuate segment having a transverse cross sectional profile having a convex shape approximating the inside curvature of the finished tire being built. Each deck plate is attached to a deck linkage assembly. The attachment of each deck plate to the deck linkage assembly is a quick release mechanism wherein the quick release mechanism is preferably a quarter turn fastener. Each two sets of deck plates is sized for a specific tire size and wherein the deck plates are arranged in sets of two, each set of two deck plates being designed for building preferably a motorcycle tire. Each deck plate is quickly detachable from the deck linkage assembly and replaced by a different sized set of deck plates for building tires of different sizes.

The rotatable tire building drum further has a pneumatic pressurized air supply connected to the building drum assembly, the air supply being operated by valves to move the bead locks radially outward to lock the pair of beads of a unvulcanized tire carcass. The bead locks are expandable to accommodate bead diameters of 16 inch, 16.5 inch and 17 inch tires. In a preferred embodiment, the rotatable motorcycle tire building drum has two sets of deck plates which include the first set of six even deck plates 2, 4, 6, 8, 10, 12 and a second set of six odd deck plates 1, 3, 5, 7, 9, 11 arranged circumferentially in the sequence 1, 2, 3, 4, 5, 6, 7, 8, 9, 10, 11, 12 to form a solid deck when radially expanded. The building drum is particularly useful in building motorcycle tires.

DEFINITIONS

As used herein and in the claims.

"Apex" means an elastomeric filler located radially above the bead and interposed between the plies and the ply turn-up.

"Axial" and "axially" means the lines or directions that are parallel or aligned with the longitudinal axis of rotation of the tire building drum.

"Bead" means that part of the tire comprising an annular tensile member commonly referred to as a "bead core" wrapped by ply cords and shaped, with or without other reinforcement elements such as flippers, chippers, apexes, toe guards and chafers, to fit the design rim.

"Belt Structure" or "Reinforcing Belts" means at least two annular layers or plies of parallel cords, woven or unwoven, underlying the tread, unanchored to the bead, and having both left and right cord angles in the range from 17 degrees to 27 degrees with respect to the equatorial plane of the tire.

"Carcass" means an unvulcanized laminate of tire ply material and other tire components cut to length suitable for splicing, or already spliced, into a cylindrical or toroidal shape. Additional components may be added to the carcass prior to its being vulcanized to create the molded tire.

"Casing" means the tire carcass and associated tire components excluding the tread.

"Chafers" refers to narrow strips of material placed around the outside of the bead to protect cord plies from the rim, distribute flexing above the rim, and to seal the tire.

"Circumferential" means lines or directions extending along the perimeter of the surface of the annular tread perpendicular to the axial direction.

"Cord" means one of the reinforcement strands of which the plies in the tire are comprised.

"Equatorial Plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Insert" means an elastomeric member used as a stiffening member usually located in the sidewall region of the tire.

"Ply" means a continuous layer of rubber-coated parallel cords.

"Radial" and "radially" mean directions radially toward or away from the axis of rotation of the tire building drum.

"Radial Ply Tire" means a belted or circumferentially restricted pneumatic tire in which at least one layer of ply has the ply cords extend from bead to bead at cord angles between 65 degrees and 90 degrees with respect to the equatorial plane of the tire.

"Shoulder" means the upper portion of sidewall just below the tread edge.

"Sidewall" means that portion of a tire between the tread and the bead.

"Tread" means a rubber component which when bonded to a tire carcass includes that portion of the tire that come into contact with the road when the tire is normally inflated and under normal load.

"Tread Width" means the arc length of the tread surface in the axial direction, that is, in a plane parallel to the axis of rotation of the tire.

BRIEF DESCRIPTION OF THE DRAWINGS

The invention will be described by way of example and with reference to the accompanying drawings in which.

DETAILED DESCRIPTION OF THE INVENTION

Figure 16:
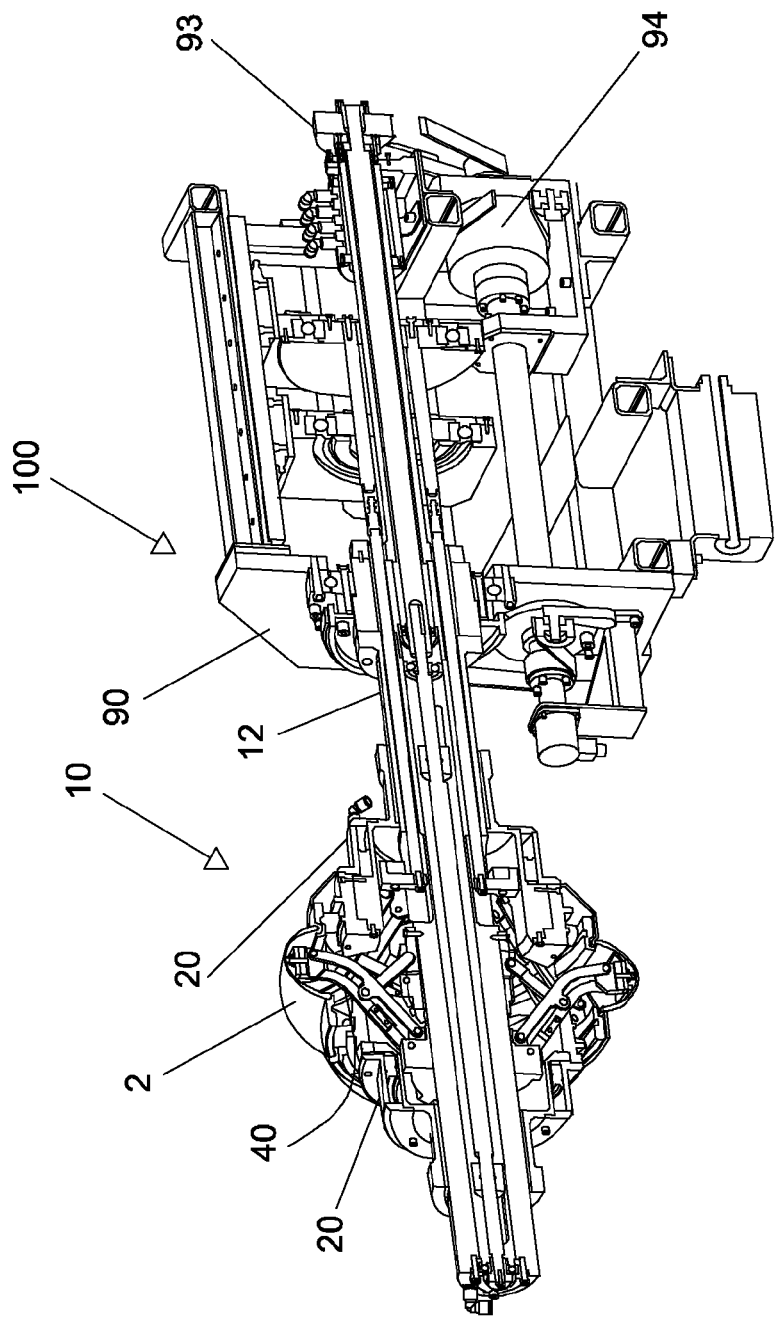
FIG. 16 is a cross-sectional view of the building drum and housing.
Figure 17:
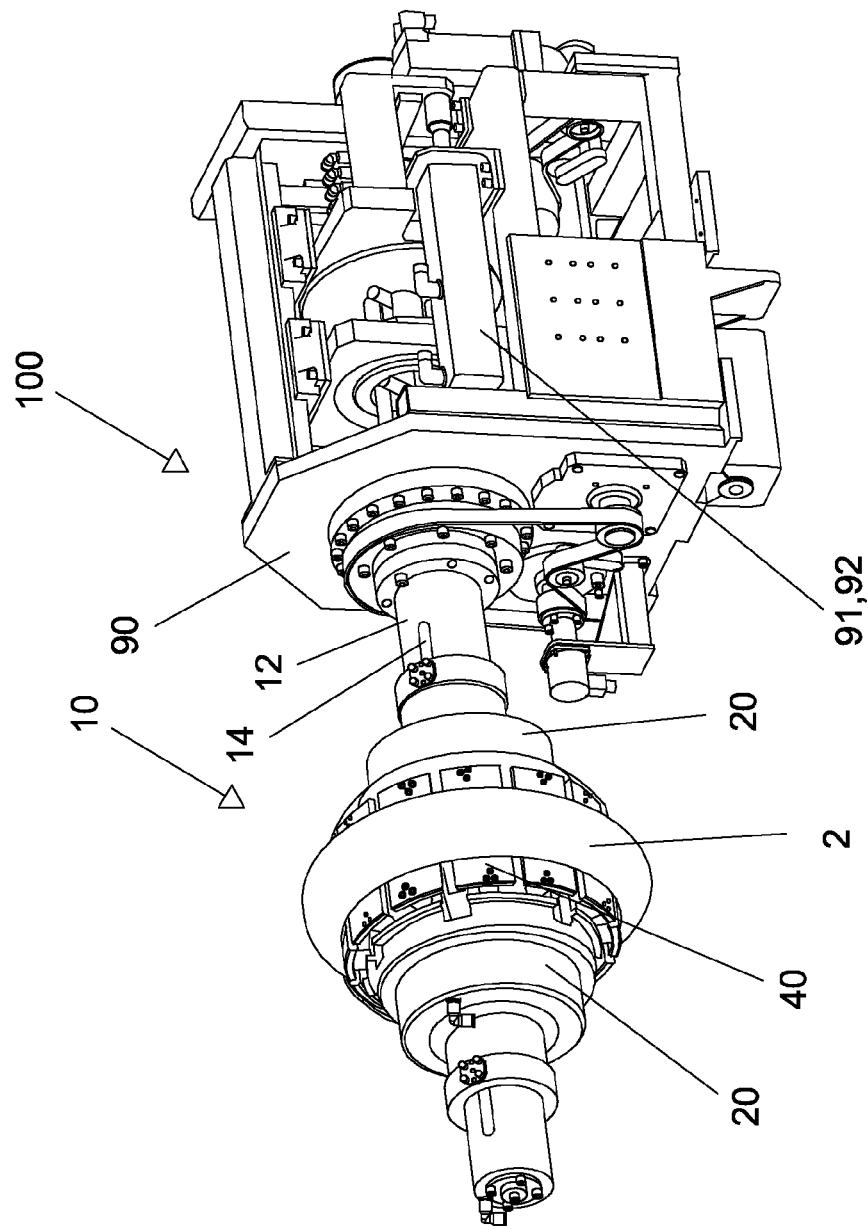
FIG. 17 is a perspective view of the overall machine showing the tire building drum assembled to the machine housing showing an exemplary carcass on the drum.

With reference to FIGS. 1-17, various views of the tire building drum according to the present invention are illustrated. In each of the FIGS. 1-15 the relative position of the tire building drum 10 in relation to a tire carcass 2 is described, but for clarity the tire carcass 2 is not shown. In FIGS. 16 and 17 the tire carcass 2 is shown on the building drum 10 to make the understanding of the invention complete.

Figure 1:
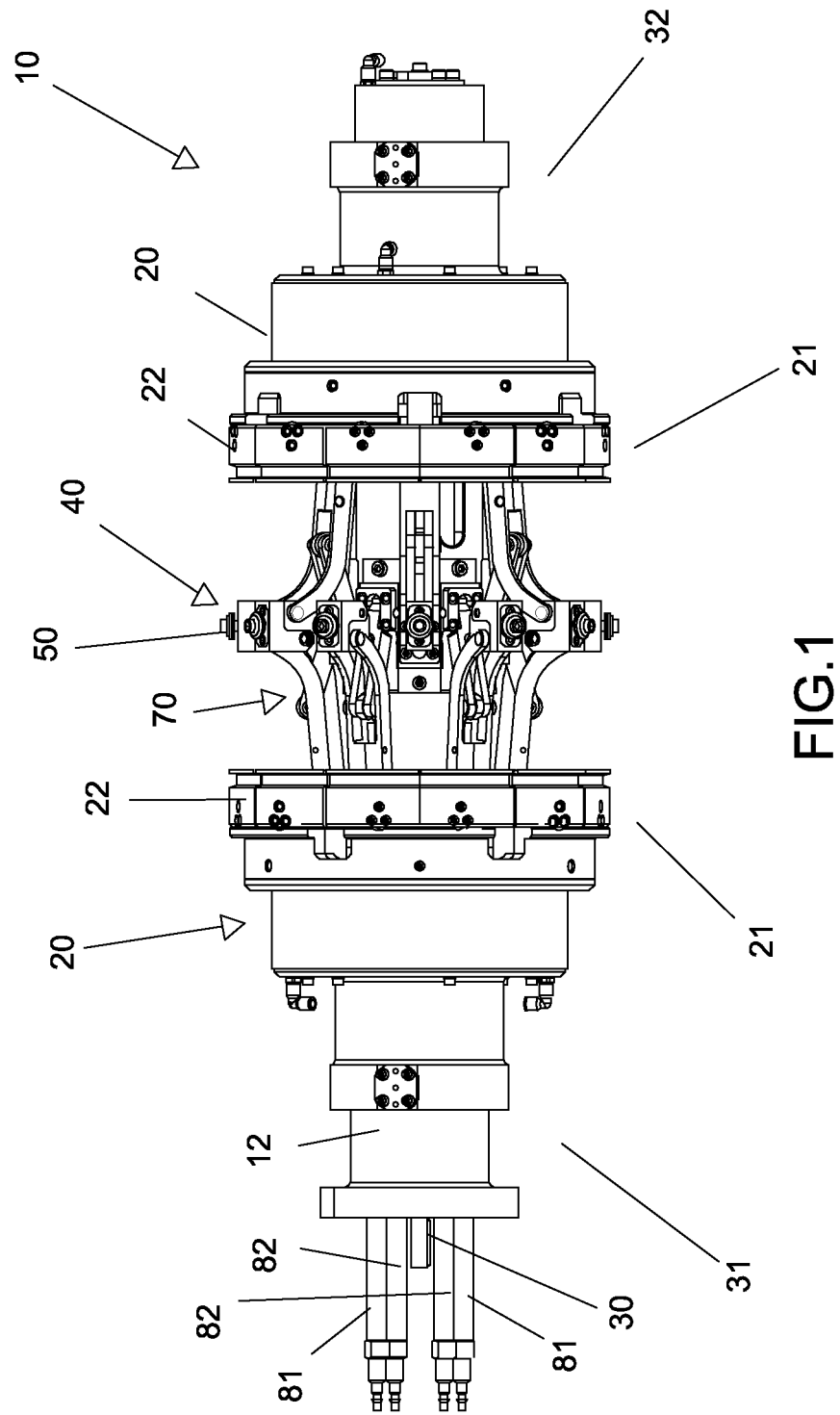
FIG. 1 is a plan or side view of the tire building drum of the present invention with the bead lock shown in the start position with the bead locks retracted and axially spaced wider than the finished bead width of a tire.

With reference to FIG. 1, the tire building drum 10 is shown in a fully retracted position wherein a pair of two opposing bead locks 20 are spaced at an axial width with one bead lock 20 located on each side of a center deck assembly 40 shown in a fully retracted position. This view in FIG. 1 is a position in which the building drum 10 is normally oriented prior to the start of a stage two tire building process. In this position, the bead locks 20 as shown have a plurality of arcuate segments 22 shown in a fully retracted position providing a small outer diameter. This small outer diameter allows a cylindrical tire carcass 2 shown already toroidaly shaped in FIGS. 16 and 17 to be slipped over the cantilevered end 32 of the tire building drum 10 and positioned over the pair of grooves 21 in the bead locks 20. When the tire carcass 2 is slid over the building drum 10 and the bead locks 20 are in a fully retracted position it is important that the center deck building assembly 40, also be fully refracted, to provide easy entry of the carcass 2 over the building drum assembly 10. For illustration purposes only, the center deck assembly 40 is shown with the deck plates 42, 44 removed. These deck plates 42, 44 are clearly illustrated in FIGS. 9-14 and will be explained later with regard to their function. The center deck linkage mechanism 70 is illustrated with fasteners 50 shown. These fasteners 50 provide a quick release mechanism for attaching the deck plates 42, 44 as will be described later.

Figure 2:
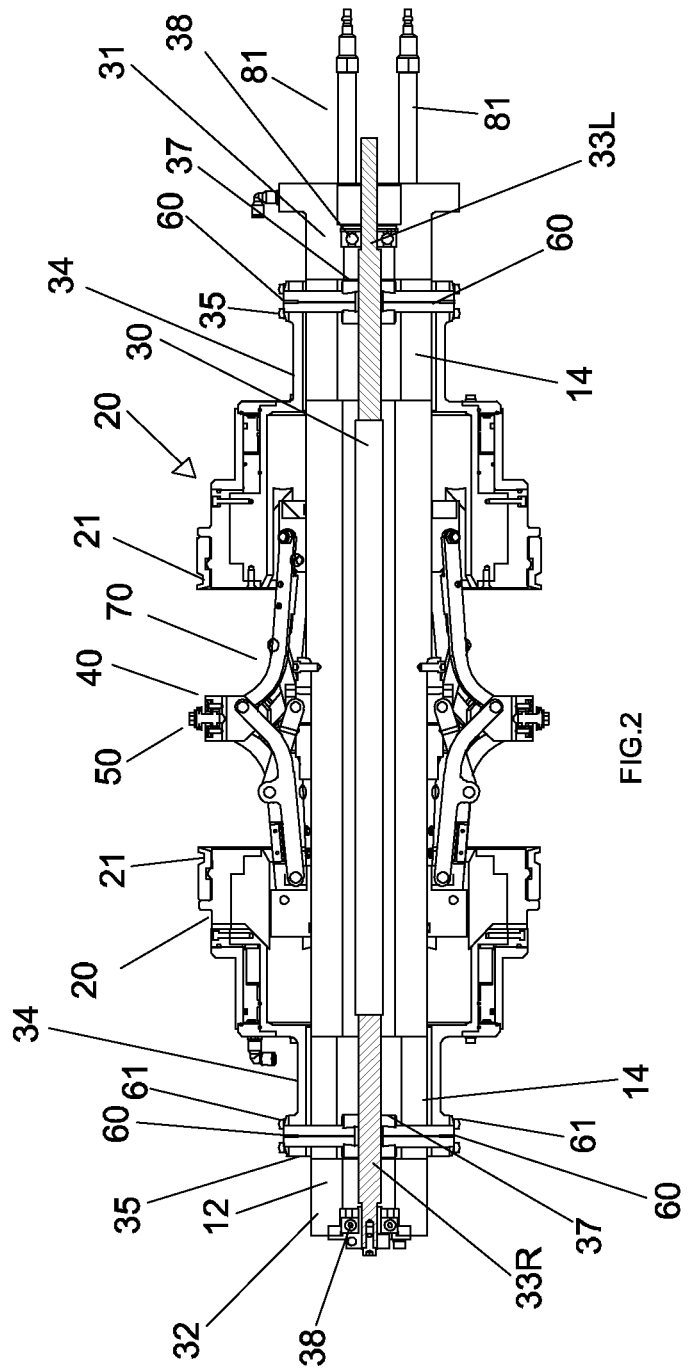
FIG. 2 is a cross-sectional view of the tire building drum shown in the start position.
Figure 18:
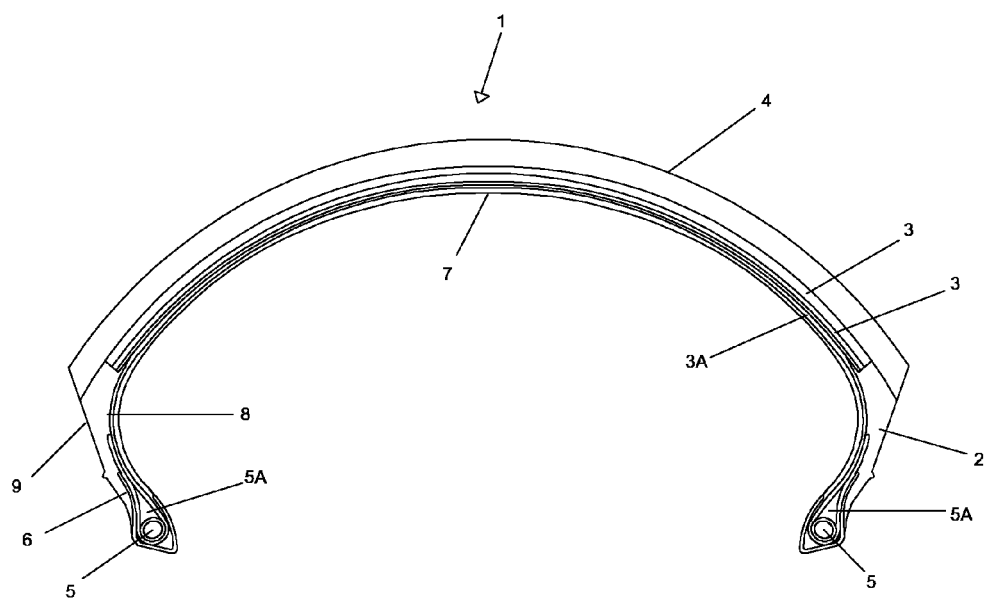
FIG. 18 is a cross-sectional view of an exemplary motorcycle tire.

With reference to FIG. 2, a cross sectional view of the building drum assembly 10 is shown. This cross sectional view shows that the building drum assembly 10 has a shaft housing 12 onto which the bead locks 20 are fully supported. These bead locks 20, as shown, are attached to a main center shaft 30 that drives the bead locks 20 axially inward or axially outward depending on the rotation of the shaft 30. For purposes of this description, the left side or end 31 of the shaft housing 12 has the main drive shaft 30 exposed and this end 31 is the end attached to the machine housing as shown in FIGS. 16 and 17. The other end 32 is the unsupported cantilevered end of the building drum 10, at that end the main shaft 30 is shown located in a bearing 38. In various views the drum 10 is seen from an opposite perspective or sides relative to FIG. 1. This is true in the illustrated view in FIG. 2, where the right hand view side is actually the end 31 showing the shaft 30 having a threaded screw 33L with left hand pitches and on the left hand side of FIG. 2 is the end 32 showing the shaft 30 having threaded screws 33R with right hand pitches. As a result, when the shaft 30 rotates in one direction the two bead locks 20 will either move simultaneously and equally towards each other or away from each other as a function of the rotation of the shaft 30. This is important in that both bead locks 20 move together equally and simultaneously. The bead lock assemblies 20 as illustrated are pinned to a threaded fastener that is a threaded nut 37 on the each end 31, 32 of the main shaft 30. Inserted through a hole 35 of the bead lock housing 34 is a flanged pin 60 that is positioned into the nut 37 and screwed with fasteners 61 into the opening or holes 35 as illustrated of the bead lock housing 34. These pins 60 being attached to the nut 37 will move linearly in the axial direction as the main center shaft 30 rotates. As illustrated, in order for the bead locks 20 to move axially, there is provided a slot 14 in the shaft housing 12. This slot 14 has a full width of at least 120 mm on each side of the housing 12. As a result, in the fully retracted starting position as shown, initially the bead locks 20 are spaced approximately 350 or 360 mm apart and can move inwardly towards each other by approximately 120 mm per side or a total of 240 mm in a fully closed position. This will be discussed later as a function of how the tire carcass 2 is assembled onto the bead locks 20. It is important to note that the entire housing shaft 12 along with the bead locks 20 and center deck assembly 40 are rotatable and this rotation enables the tire 1 to have its belt reinforcing structure 3 and tread 4 applied to the carcass 2 as shown in FIG. 18 depicting an exemplary tire 1.

Figure 3:
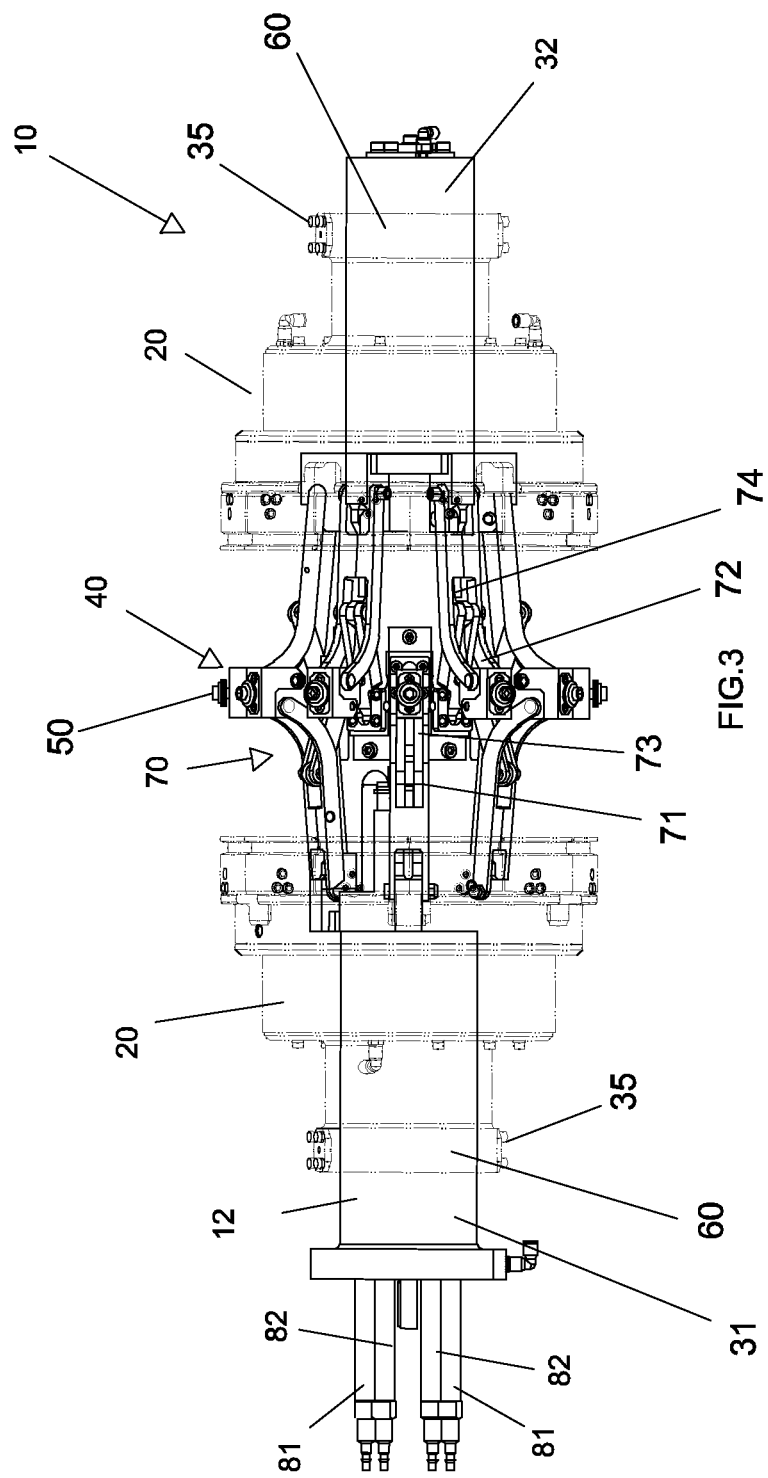
FIG. 3 is a top view of the tire building drum showing bead locks in phantom dashed lines over the axle housing and the center deck mechanism retracted.
Figure 4:
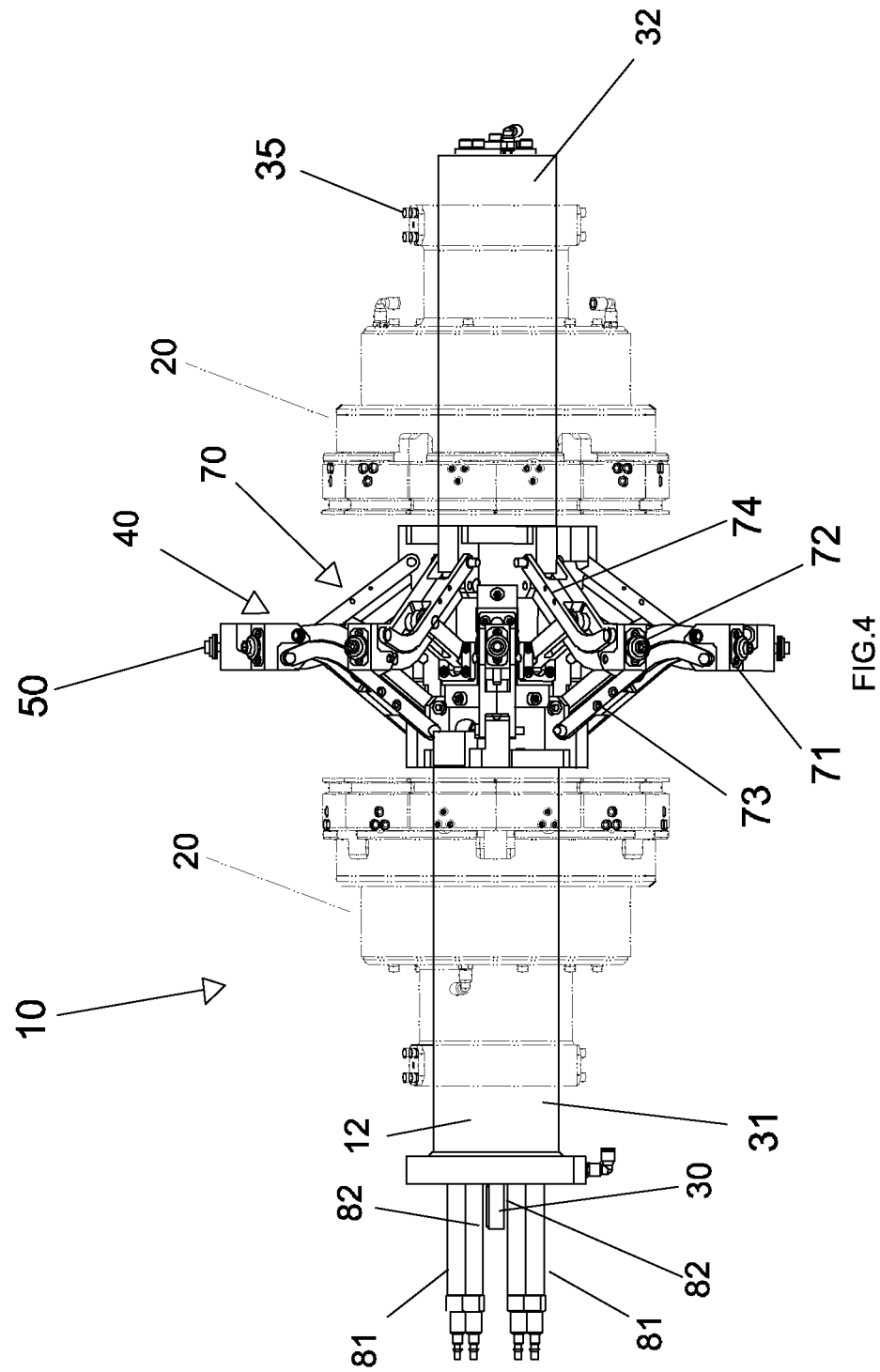
FIG. 4 is a top view of the tire building drum with the radially expanded center deck mechanism with the deck plates removed for clarity.
Figure 5:
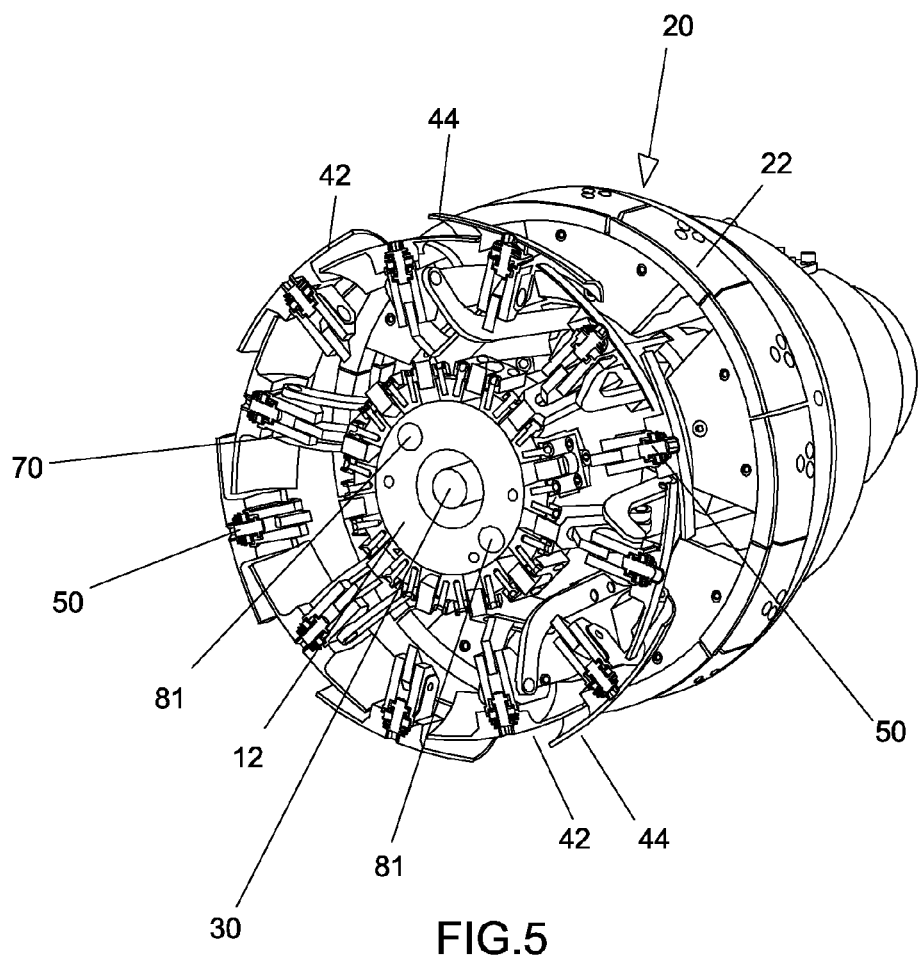
FIG. 5 is a cross sectional perspective end view of the tire building drum showing half of the center deck mechanism with the deck plates shown retracted.

With reference to FIG. 3, a similar view as shown in FIG. 1 is taken wherein the bead locks 20 are shown in phantom lines so that the underlying components of the center deck assembly linkage mechanism 70 can be more easily viewed. The center deck assembly 40 is shown in this view of FIG. 3. The center deck assembly 40 is in a fully retracted position. In this position all the linkages 71, 72, 73, 74 are drawn close to the axial housing 12 as the deck assembly 40 is moved into this fully retracted starting position. With reference to FIG. 4, the center deck assembly 40 is illustrated in the fully expanded position. As shown, all the linkages 71, 72, 73, 74 of the linkage mechanism 70 of the center deck assembly 40 are radially expanded. The linkages are moved away from the shaft housing 12 to a more vertical orientation as the deck assembly 40 is moved radially outwardly relative to the shaft housing 12. FIG. 5 is a cross-sectional end view showing the center main shaft 30 and the diametrically opposed drive shafts 81, 82 on one side of the linkage mechanism 70. The internal linkages 71, 72, 73, 74 are shown in a fully retracted position. In this view, it is particularly important to note that only half of each of the deck plate assemblies 42, 44 are illustrated to allow the underlying attachment and linkage mechanism 70 to be seen. These deck plate assemblies 42, 44 as shown are formed in two sets. The first set 42 being radially inward of the second set 44 in the illustrated embodiment. Sequentially, as shown in the preferred embodiment there are a total of 12 segments, 6 deck plates in each first set 42 and second set 44. The even numbered deck plates 42 forming a first set of plated 42 and the odd numbered deck plates 44 forming the second set of plates 44 wherein the first set 42 is radially inward of the second set 44 as illustrated. As shown, it can be appreciated that the deck plates 42, 44 are arcuate segments having a cross sectional profile that closely approximates the inside of the finished tire carcass 2. As noted only half of the deck plate 42 or 44 is shown as illustrated, the other half being cut away allowing one to see the attachment of the deck plate to the linkage at the fasteners 50 and the internal structure of the linkage mechanism 70.

Figure 6:
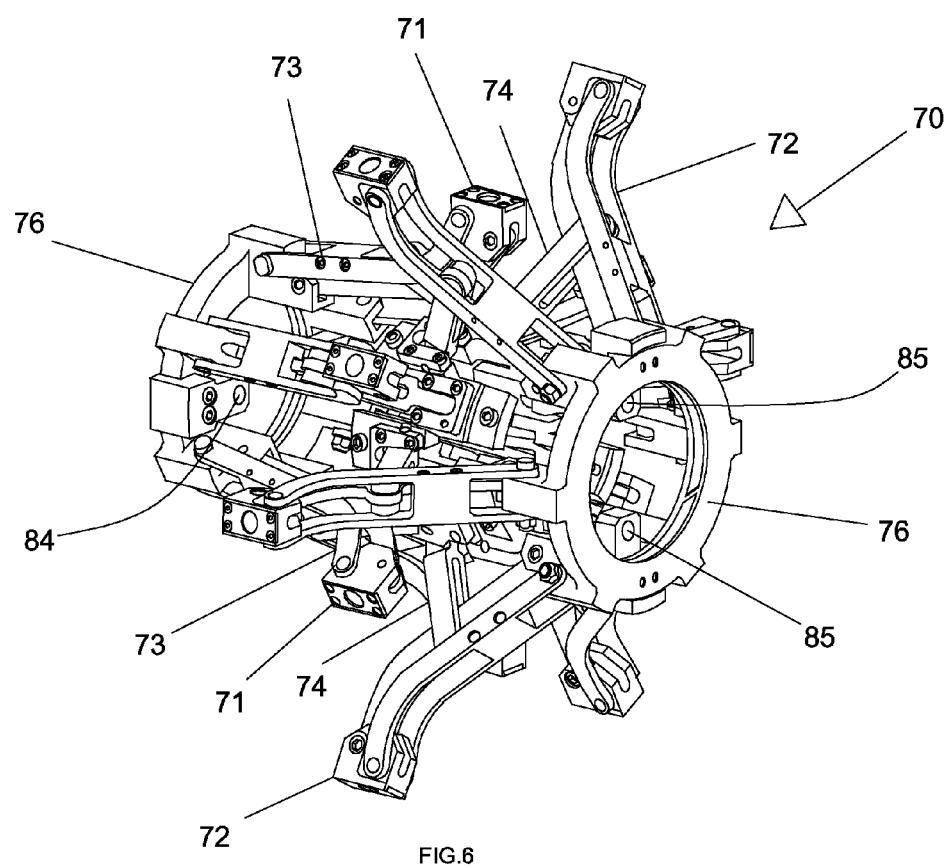
FIG. 6 is a perspective view of the tire building drum center mechanism showing the connecting linkage mechanisms with the deck plates removed for clarity.

FIG. 6 better illustrates how the center deck assembly 40 is driven radially in and out such that one can appreciate this movement created by the linkage mechanism 70. As shown, the linkages 72, 74 of the center deck assembly 40 connected to the second set 44 are shown pivotally connected and radially outward of the first set of linkages 71, 73 that move the first set of deck plates 42. The linkages 71 and 73 similarly are pinned to be pivotally connected. This is more easily appreciated by reviewing the linkage assembly in FIG. 5 with the deck plates 42, 44 shown. The deck plates in FIG. 6 being removed as well as the housing and bead lock area enabling a complete view of this linkage mechanism 70. This entire linkage mechanism 70 is connected at the end rings 76. The end rings 76 are connected to and driven by two sets of shafts 81, 82. It has been determined that by putting the shafts 81 or 82 diametrically opposite about 180 degrees relative to the axis of rotation or the main center shaft 30 the load can be balanced such that the first or second set of deck plates 42, 44 moves outwardly with an equal load on the two pairs of diametrically opposed shafts 81, 82. The drive shafts for moving the first set 42 has the shaft 81 connected at opening 84 of ring 76 and the second set of drive shafts 82 moves the outer second set of deck plates before the radially inner deck plates 42 can be moved. The linkages 71, 73 are expanded outwardly by the rotation of the second set of shafts 82 connected to the opposing ring 76 at openings 85. The openings 84 (only one visible in FIG. 6) are aligned 180 degrees apart centered on the axis as are the openings 85 with the openings 84 being oriented 90 degrees to the openings 85. By having these pairs of shafts 81, 82 diametrically opposed and oppositely positioned between each other provides a compact way of providing a means to drive the linkage mechanism 70. It is important to note the first shaft 81 and second shaft 82 of the drive shafts are provided in pairs to balance the load and secondarily each of these pairs are driven by an independent linear motor 91 or 92 housed in the motor housing 90 as shown in FIG. 17. Accordingly, when a tire carcass 2 is being positioned onto the building drum 10 of the present invention, the bead locks 20 are first moved into a position by rotation of the main shaft 30 and radially expanded to secure the beads and then the center mechanism 40 of the drum 10 with a carcass 2 is expanded then the drum 10 is rotated to apply the belt structure and the belts as will be further described.

Figure 7:
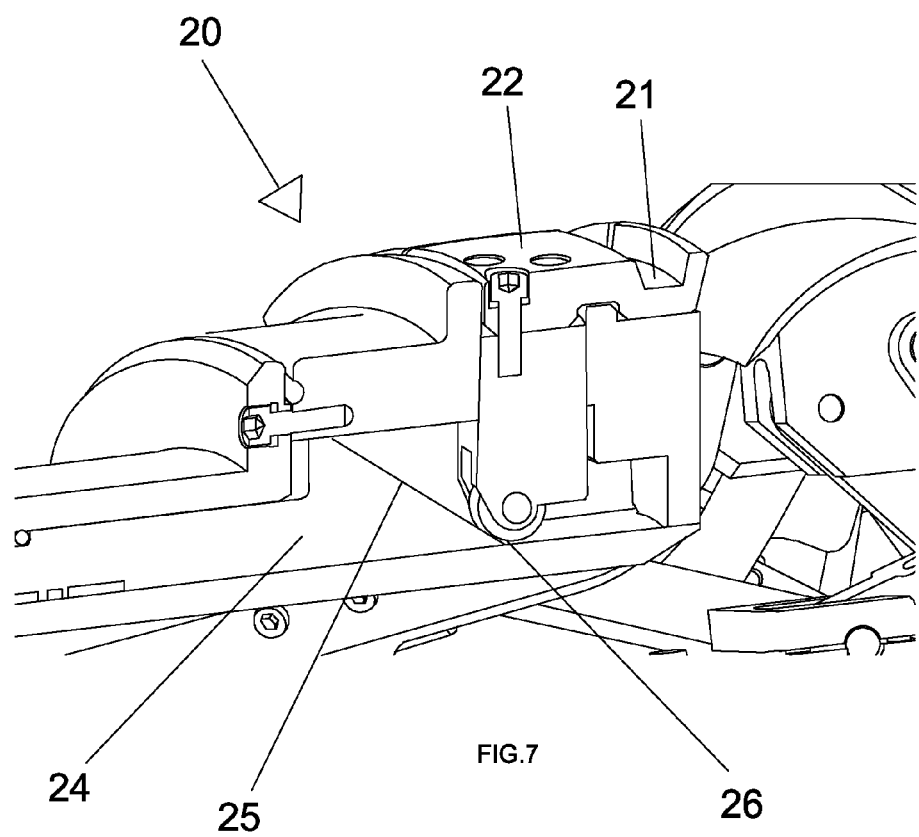
FIG. 7 is a cross sectional view of a portion of the bead lock of the tire building drum showing the ramped guide withdrawn and the bead lock retracted.
Figure 8:
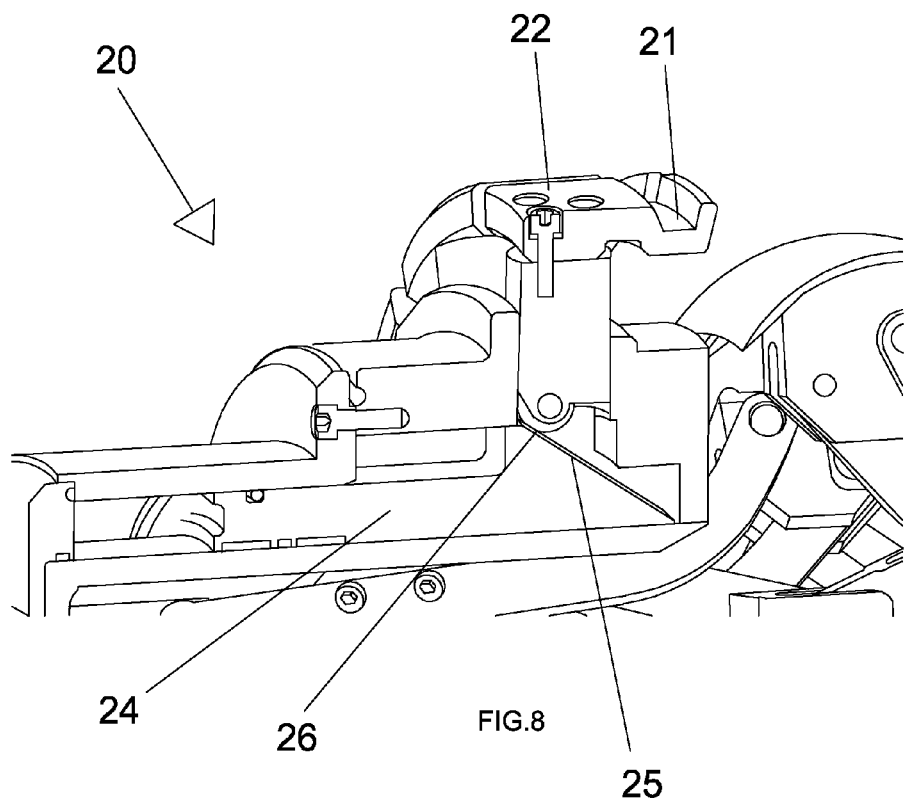
FIG. 8 is the view of FIG. 7 of the tire building drum showing the bead lock ring in the radially expanded condition and the ramped guide lifting the roller on the bead lock ring.

With reference to FIGS. 7 and 8, a portion of the bead lock assembly 20 is shown. In FIG. 7, the bead lock assembly 20 is shown in the retracted position. A ramped surface 25 is shown pulled back from a wheel 26 attached to the segments 22 of the bead lock assembly 20. This ramped surface 25 is part of the moveable ring shaped element 24 which is better illustrated in FIG. 8. In FIG. 8, the bead lock 20 can be seen in the fully expanded condition, the ramped surface 25 is moved inwardly toward the center deck assembly 40. This movement is caused by air pressure acting on the ring element 24 to move it. The air pressure is supplied to the bead lock assemblies 20 on each side of element 24 and upon activation a valve (not illustrated) is opened causing the element 24 with ramped surface 25 to move toward the center deck 40 pushing the wheels 26 attached to each segment 22 of the bead lock assembly 20 upward. The amount of pressure applied in the assembly provides a sufficient amount of force to hold the beads of the carcass 2 in place during the tire building assembly. It is important to note in both FIGS. 7 and 8 that the bead locks arcuate segments 22 are shown exposed, but in normal manufacturing conditions a thin layer of rubber in a band or stretchable ring like shape is applied over the bead lock segments 22 in such a fashion that the uncured soft rubber lying over the bead locks 20 will not be damaged as the segments 22 expand into the fully opened position. This band underlies the beads of the carcass 2 in FIG. 17 and is between 2 to 4 mm thick.

Figure 9:
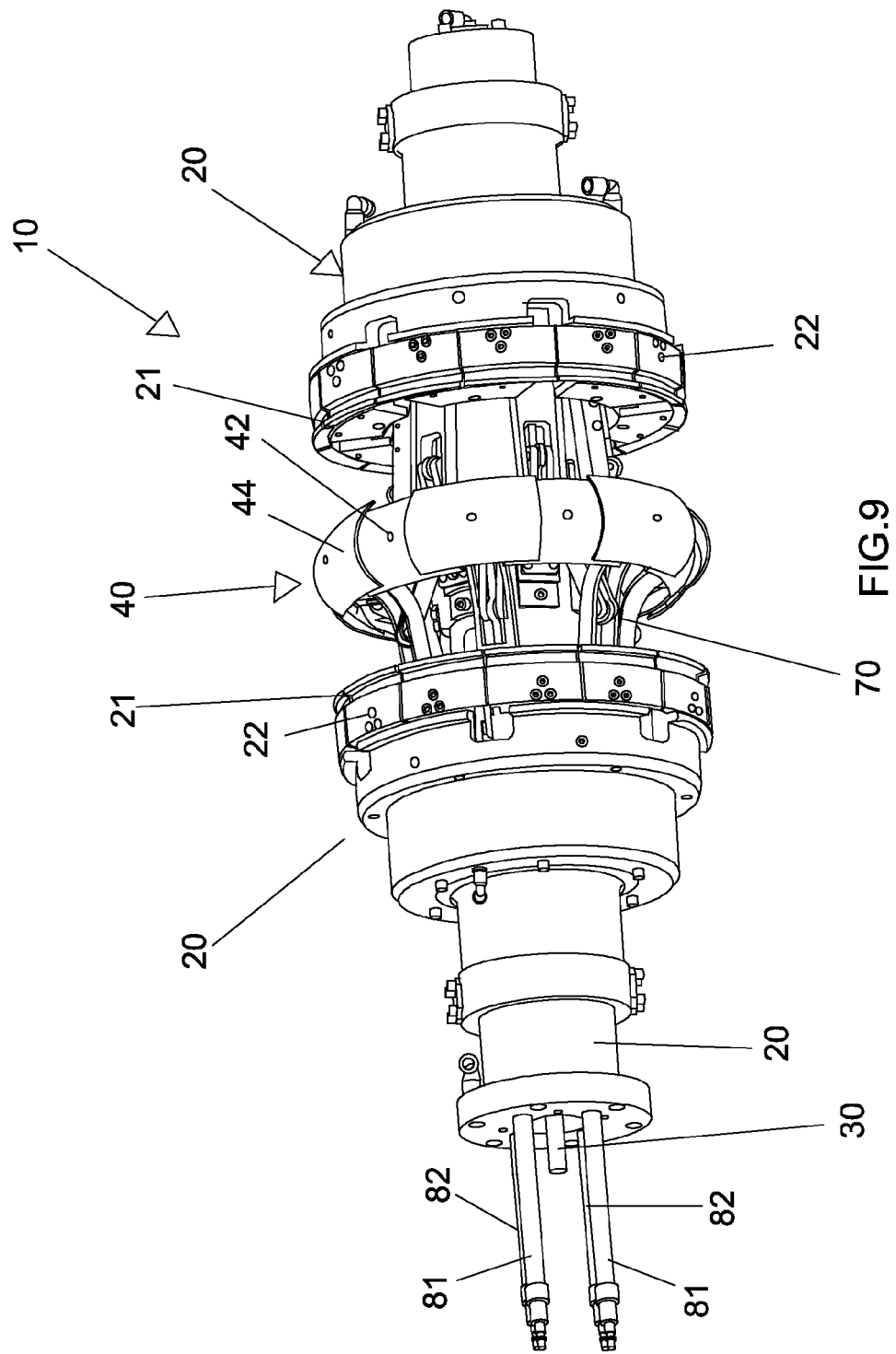
FIG. 9 is a perspective view of the tire building drum showing the deck plated retracted in the start position with bead locks retracted.
Figure 10:
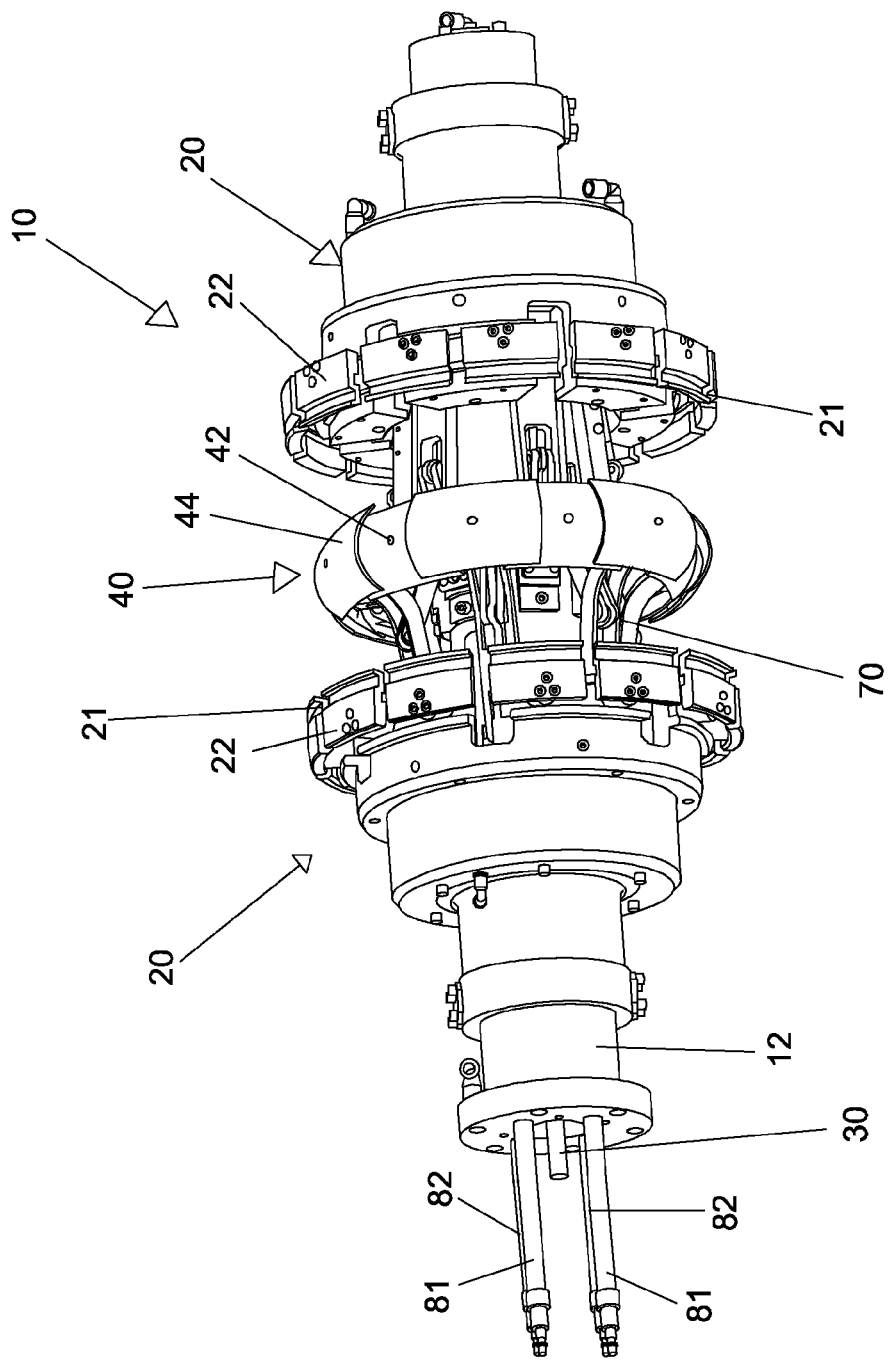
FIG. 10 is a perspective view of the tire building drum showing the bead locks expanded with the deck plates retracted.
Figure 11:
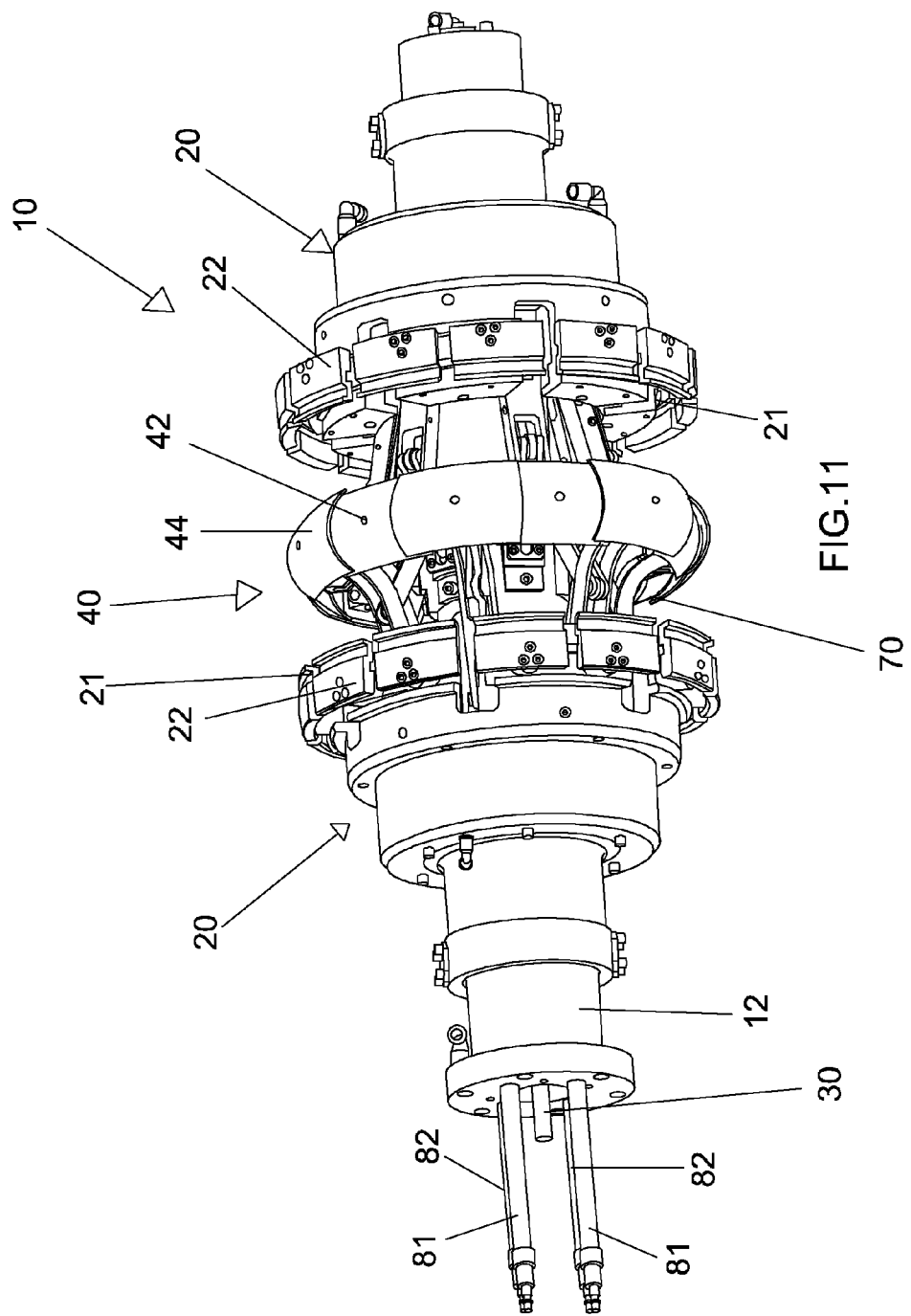
FIG. 11 is a perspective view of the tire building drum shown in the center deck plate in a shaping position starting to expand.
Figure 12:
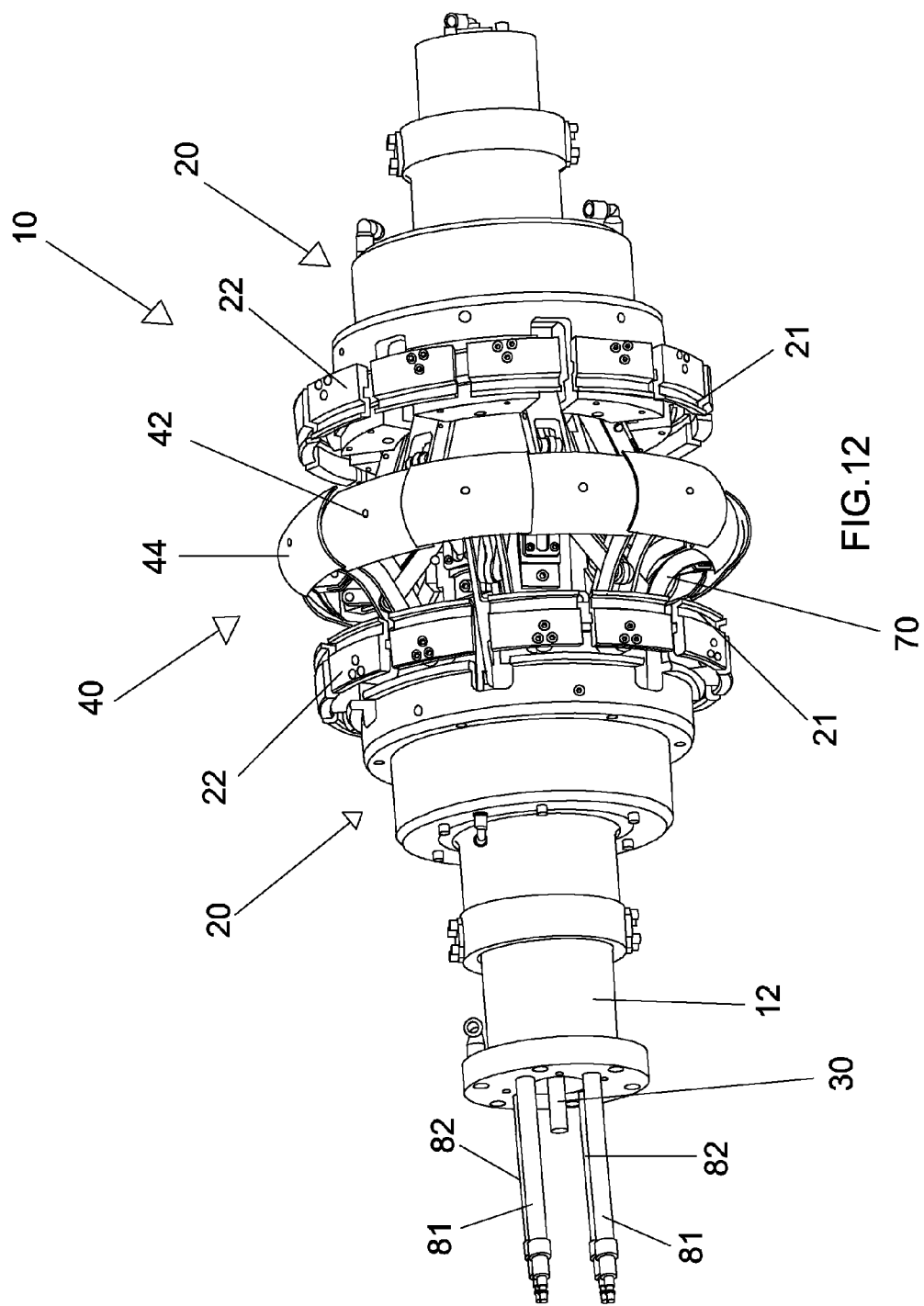
FIG. 12 is a perspective view showing the bead locks moving toward the expanding center deck of the tire building drum.
Figure 13:
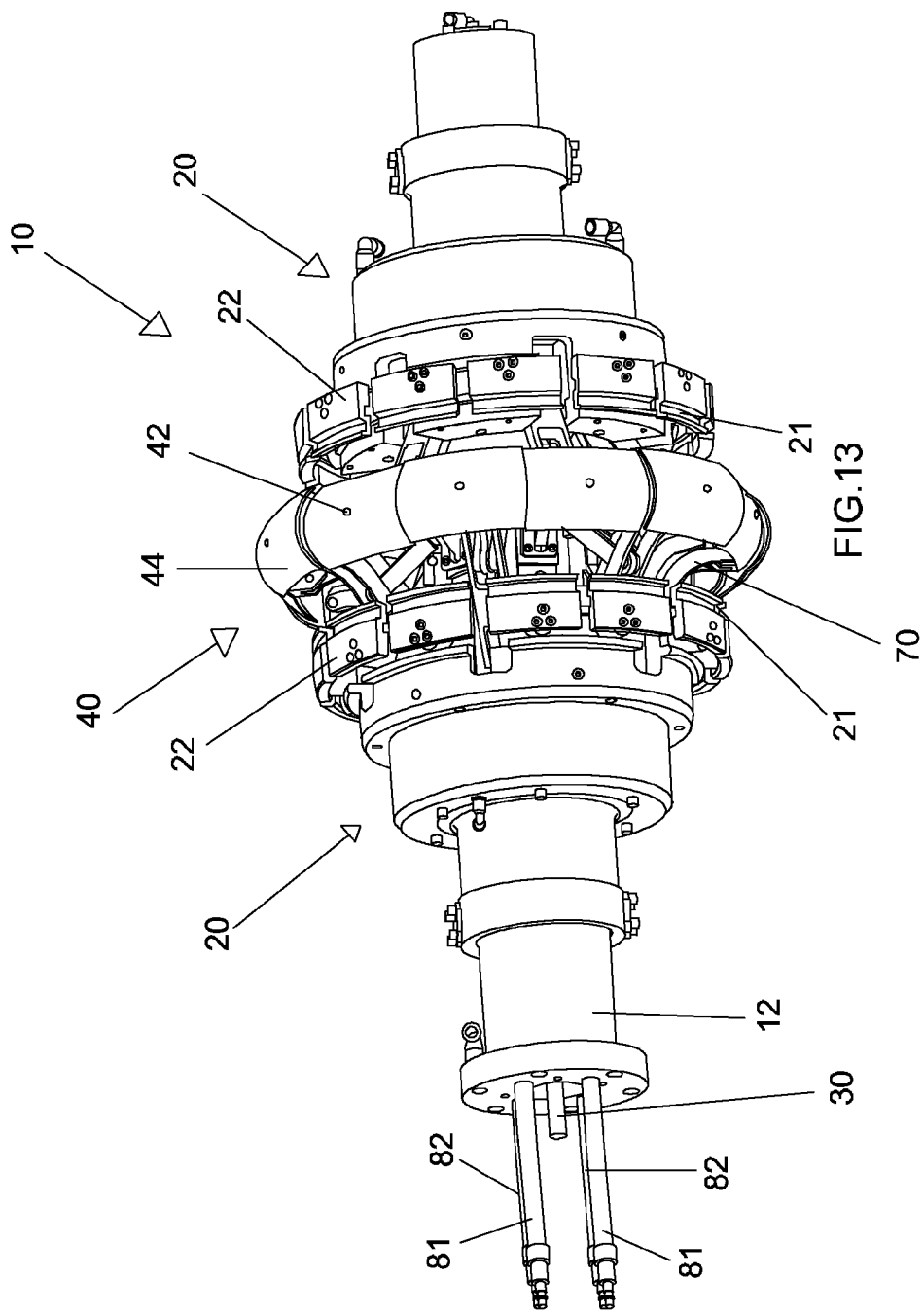
FIG. 13 is a perspective view of the tire building drum showing the bead locks moved to the correct bead width as the center deck plates continue to radially expand.
Figure 14:
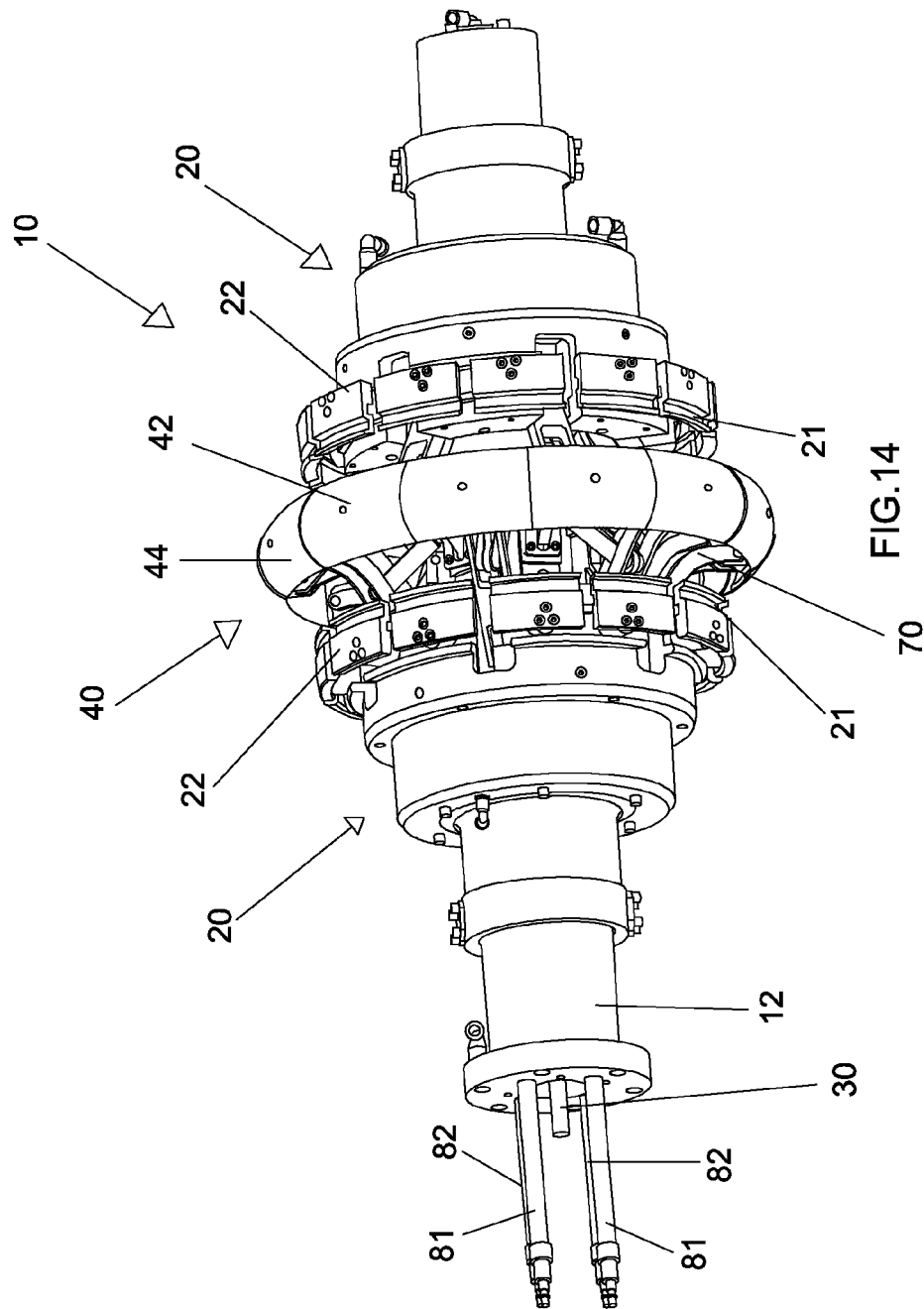
FIG. 14 is a perspective view of the center deck plate abutted to form a solid deck for final assembly and application of the belt structure and tread layer to form a finished tire.
Figure 15:
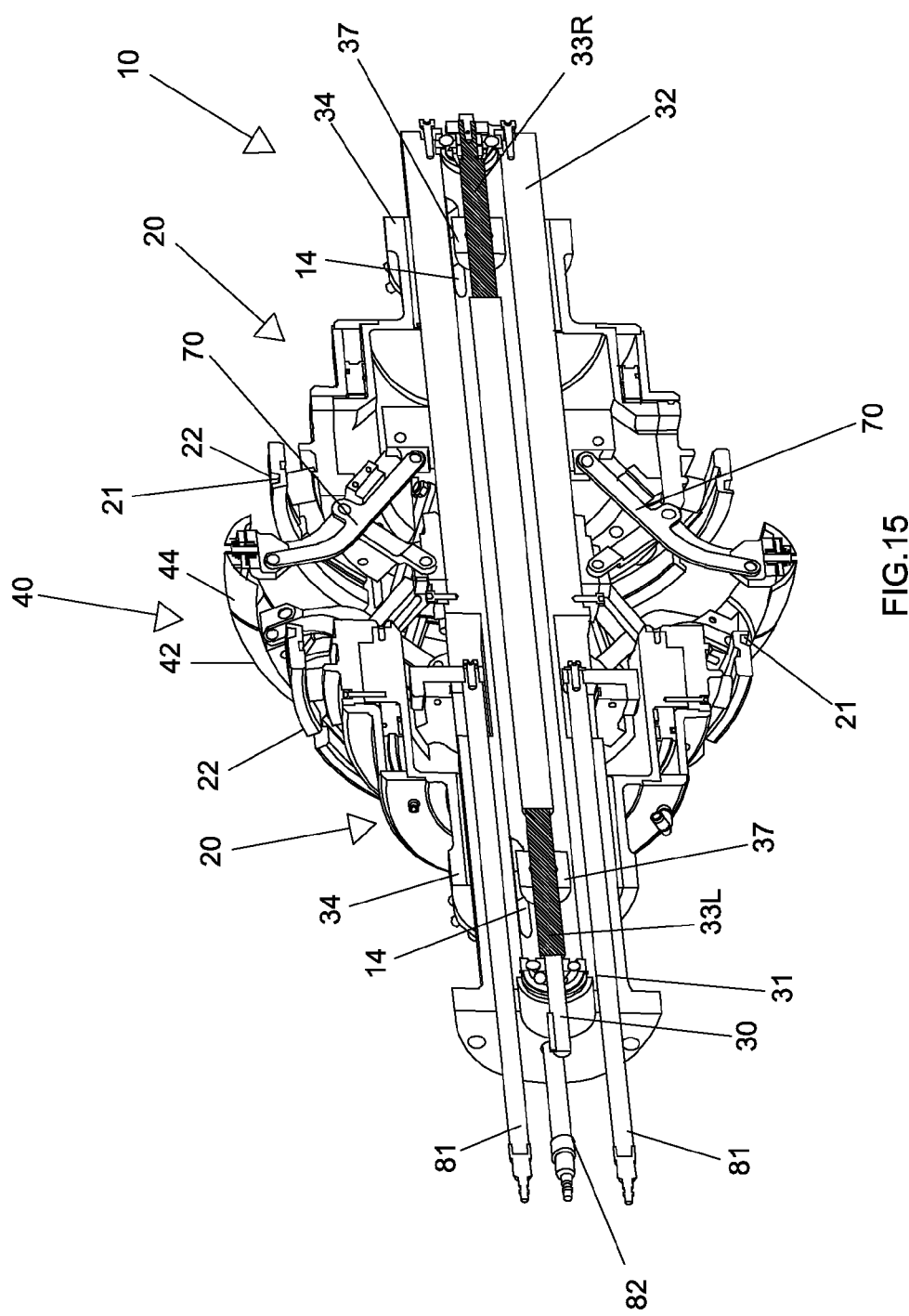
FIG. 15 is a cutaway perspective view of the tire building drum of FIG. 14.

With reference to FIGS. 9-15, the tire building sequence is illustrated with respect to the building drum's orientation and movements during the building process. With reference to FIG. 9, the deck plates 42 and 44 are shown in the fully retracted position in such a fashion that the first set of deck plates 42 is lying radially inward of the second set 44 as illustrated. In this position, the bead locks 20 are moved axially outwardly relative to the center deck 40 in such a fashion that they are moved to the fully retracted, opened or start position. In this position they are set to receive a tire carcass 2, not illustrated. As can be further seen in FIG. 9, the bead lock segments 22 are fully abutting in this fully retracted orientation. Next the bead locks 20 expand radially outward to hold the beads of the carcass 2 in the grooves 21, this is illustrated in FIG. 10 wherein the segments 22 start to move radially outward creating a gap between the underlying adjacent bead lock segments 22. As previously noted, a rubber band elastic band material is placed over the segments 22 such that as the carcass 2 is being held by the bead locks 20 the underlying segments can't cut into the soft, uncured bead rubber. With reference to FIG. 11, as the bead locks 20 are being moved axially inward towards the center bead deck assembly 40, the deck assembly 40 is starting to expand radially outwardly. The radially outer set 44 preferably initially moves as the underlying set 42 follows. In any event, the radially inner set cannot move faster than or before the outer set 44 to avoid the plates from jamming together. This expansion continues as shown in FIG. 12 wherein the carcass 2 due to the radial expansion of the center deck assembly 40 will be tensioned slightly by the underlying deck plates as it approaches a fully expanded position. When the bead locks are moved to the proper bead width of the tire as set by the building codes for the specific tire size, the radially expanded deck plates 42, 44, shown in FIG. 13 are almost fully expanded. With reference to FIG. 14, the underlying deck plates 44 are shown in the fully expanded position wherein the circumferentially adjacent deck plates 42, 44 are shown in an abutting relationship. In this position the tire carcass 2 is now ready to have the belt reinforcing structure 3 and tread 4 applied. To further illustrate this view of the fully expanded building drum assembly, a cross sectional view of FIG. 15 is shown as can be seen the bead locks 20 are moved axially inwardly to the desired distance of the bead width of the tire 1 and the center deck assembly 40 is in the fully expanded position.

The entire machine assembly 100 is shown with the building drum assembly 10 cantilevered onto the machine housing 90 in such a fashion that the entire drum assembly 10 is cantilevered from one end of the machine housing 90 as illustrated in FIG. 16. As shown in FIGS. 16 and 17, an unvulcanized and uncured tire carcass 2 is shown mounted on the fully expanded center deck assembly 40 as illustrated. To better appreciate this view, in FIG. 16 a cross-section of the entire machine assembly 100 is illustrated. As shown the housing 90 has two linear motors 91, 92, one for driving the first set of drive shafts 81, the second one for driving the second set of drive shafts 82 respectively. In addition to the two linear motors 91, 92, a central drive motor 94 is illustrated for running the entire shaft housing 12 and a motor 93 which drives the central main shaft 30 of the main assembly is illustrated. Accordingly, the main shaft 30 is driven by an electric motor 93 which moves the bead locks 20 axially inwardly or outwardly depending on the rotation of the main shaft 30 and the two linear motors 91, 92 drive the pairs of deck drive shafts 81, 82 that are positioned in pairs in the axial housing 12 as previously discussed axially in or out to raise or lower the linkage mechanism 70. These linear motors 91, 92 when moving the drive shafts 81, 82 enable the deck plates 42, 44 to move in their respective set independently of the other set. In combination, all three motors 91, 92, 93 are independently programmable in such a fashion that the movement of the bead locks 20 in association with the center deck plates 42, 44 on the deck assembly 40 can be achieved in a programmable sequential fashion in order to help shape and conform the tire carcass 2 to the proper shape of approximating a finished tire. At this point, the tire belt reinforcing structure 3 and tread 4 can be applied on a 360 degree solid deck surface.

As shown in FIG. 18, an exemplary tire carcass 2 of an exemplary tire 1 of the present invention is shown, the tire 1 as shown has the underlying carcass 2 with the pair of beads 5 and apex 5A, and a radial ply turnup 6 as illustrated and an air impervious inner liner 7 radially inward of the tire ply 8. Sidewall rubber 9 is applied as shown and this blends with other strips of rubber to form the basic tire carcass 2. Once this tire carcass 2 is assembled in a first stage in a rather cylindrical shape on a separate machine it is then conformed to its arcuate, toroidal shape in a second stage at the tire building drum 10 of the present invention. As illustrated, once the carcass 2 is positioned on the building drum 10 and the bead locks 20 are positioned properly in the fully expanded position, the tire carcass 2 will be conformed to the shape very close to a finished tire structure as the bead locks 20 move axially together setting the proper bead width as the solid deck assembly is being fully expanded. At this point as illustrated, a spiral or zigzag overlay 3A can be attached to the tire carcass 2 as shown in FIG. 17, in addition two belt reinforcing layers 3 can be applied to the tire carcass 2 and then the tread 4 overlaying that to make the finished uncured tire 1. When building a tire with a wound overlay, be it spirally wound at close to 0 degrees relative to a circumferential center plane of the tire or in a zigzag pattern across the tire, it is most important the building surface is exact with no deviations; the center deck assembly achieves this. As noted, to build different sized tires, deck plates 42, 44 of one size can be quickly exchanged with new sets of deck plates 42, 44 for different sized tires. This allows for tires of different cross sections defining the tires aspect ratio and different diameter to be built on the same machine 100 allowing the tire designer a greater ability to properly size the tire 1.

As shown in the preferred embodiment, these tires 1 are motorcycle tires specifically designed with nominal bead diameters of 16 inch 16.5 inch or 17 inch. As shown the present embodiment invention is capable of providing a variety of motorcycle tires of varying sizes, aspect ratios and bead widths depending on the tire construction so desired. When the tire building drum 10 is programmed to build a particular tire 1, it will set the proper bead width and the bead locks 20 will be positioned so that they can hold bead diameters ranging from 16-17 inches accommodating a variety of sizes. Once the finished tire 1 is assembled the bead locks 20 can be retracted as well as the center deck assembly 40 enabling the tire 1 to be simply removed off the building drum 10. Once removed, the bead locks 20 and center drum assembly 40 will move to the fully open starting position as illustrated in FIG. 1.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A rotatable tire building drum comprises a rotatable building drum assembly having a pair of axially and radially moveable bead locks and a radially expandable center building deck assembly that tensions a tire carcass upon expansion by only twelve underlying equally sized deck plates and when fully expanded to a fully expanded diameter forms a 360 degree solid deck surface formed by the twelve deck plates which are divided in a first and second set of deck plates, each set having six deck plates, and wherein each deck plate is attached to a deck linkage assembly, the deck plates of the first set being attached to first linkages of the deck linkage assembly and the deck plates of the second set being attached to second linkages of the deck linkage assembly, wherein the first linkages are connected to a first end ring and operable to expand all of the first set of deck plates by an axial drive movement of the first end ring solely in one axial direction and the second linkages are connected to a second opposing end ring located on an opposite side of an equatorial plane of the drum from the first end ring and operable independently of the first linkages to expand all of the second set of deck plates by an axial drive movement of the second opposing end ring solely in a second opposite axial direction, and the attachment of each deck plate to the deck linkage assembly is a quick release mechanism wherein the quick release mechanism is a quarter turn fastener and wherein each two sets of deck plates is sized for a specific tire size wherein each deck plate is configured to be quickly detachable from the deck linkage assembly and replaceable by a different sized set of deck plates for building tires of different sizes and wherein each deck plate is formed as a single undivided arcuate segment having a transverse cross sectional profile having a convex shape approximating the inside curvature of a finished tire.

2. The rotatable tire building drum of claim 1 wherein the finished tire is a motorcycle tire and the pair of bead locks are moveable axially inwardly 120 mm per side to a fully closed position.

3. The rotatable tire building drum of claim 1 wherein the deck plates are arranged in the two sets of six deck plates, each set of six deck plates being designed for building a motorcycle tire.

4. The rotatable tire building drum of claim 1 further comprises a pneumatic pressurized air supply connected to the building drum assembly, the air supply being operated by valves to move the bead locks radially outward to lock a pair of beads of an unvulcanized motorcycle tire carcass.

5. The rotatable tire building drum of claim 1 wherein the bead locks are expandable to accommodate motorcycle tires having a bead diameter of 16 inches or 16.5 inches or 17 inches.

6. The rotatable tire building drum of claim 1 wherein the two sets of deck plates include a first set of six even deck plates 2, 4, 6, 8, 10, 12 and a second set of six odd deck plates 1, 3, 5, 7, 9, 11 arranged circumferentially in the sequence 1, 2, 3, 4, 5, 6, 7, 8, 9, 10, 11, 12 to form a solid deck when radially expanded.

7. A rotatable tire building drum machine comprises:
a shaft housing;
a rotatable building drum assembly having a pair of axially moveable and radially expandable bead locks for holding and securing a pair of beads of a green or unvulcanized motorcycle tire supported on the shaft housing;
a center radially expandable and retractable building deck assembly having only twelve equally sized deck plates divided into two sets positioned axially between the bead locks and supported on the shaft housing, the building deck assembly having the two sets of deck plates tension a tire carcass upon expansion, the deck plates form a fully expanded diameter forming a solid 360 degree building surface to support the tire carcass at a specified diameter wherein the two sets of deck plates are divided into a first set of even deck plates and a second set of odd deck plates, arranged in a sequence of twelve circumferentially adjacent abutting deck plates 1, 2, 3, 4, 5, 6, 7, 8, 9, 10, 11, 12 in an expanded state and in a retracted state the first set of even numbered deck plates move radially inward of the second set of odd numbered deck plates resulting in a contracted position radially inward of the second set, the first set underlying the second set;
a main center shaft connected to the bead locks having two opposing ends a first left end having a left screw pitch and a second right end having a right screw pitch, rotation of the main center shaft moves the bead locks axially;
two pairs of diametrically opposed deck shafts internally mounted in the shaft housing, including a first pair of drive shafts having two first shafts aligned 180 degrees apart for moving the even deck plates, a second pair of drive shafts having two second shafts aligned 180 degrees apart each second shaft being equally positioned at 90 degrees between two first shafts, the second shafts for moving the odd deck plates; and
wherein the shaft housing is cantilevered at one end mounted to a motor housing and the motor housing includes three independent motors, a first motor for rotating the main center shaft; a second motor for driving the two first shafts of the first pair of drive shafts and a third motor for driving the two second shafts of the second pair of drive shafts and wherein each deck plate is attached to a deck linkage assembly, the deck plates of the first set being attached to first linkages of the deck linkage assembly and the deck plates of the second set being attached to second linkages of the deck linkage assembly, wherein the first linkages are connected to a first end ring and operable to expand all of the first set of deck plates by an axial drive movement of the first end ring by the second motor solely in one axial direction and the second linkages are connected to a second opposing end ring located on an opposite side of an equatorial plane of the drum from the first end ring and operable independently of the first linkages to expand all of the second set of deck plates by an axial drive movement of the second opposing end ring by the third motor solely in a second opposite axial direction, and the attachment of each deck plate to the deck linkage assembly is a quick release mechanism wherein the quick release mechanism is a quarter turn fastener and wherein each two sets of deck plates is sized for a specific tire size, wherein each deck plate is configured to be quickly detachable from the deck linkage assembly and replaceable by a different sized set of deck plates for building tires of different sizes and wherein each deck plate is formed as a single undivided arcuate segment having a transverse cross sectional profile having a convex shape approximating the inside curvature of a finished tire.

8. The rotatable tire building drum machine of claim 7 wherein the finished tire is a motorcycle tire and the pair of bead locks are moveable axially inwardly 120 mm per side to a fully closed position.

9. The rotatable tire building drum machine of claim 7 wherein the deck plates are arranged in two sets, each set of deck plates being designed for building a motorcycle tire.

10. The rotatable tire building drum machine of claim 7 further comprises a pneumatic pressurized air supply connected to the building drum assembly, the air supply being operated by valves to move the bead locks radially outward to lock a pair of beads of an unvulcanized motorcycle tire carcass.

11. The rotatable tire building drum machine of claim 7 wherein the bead locks are expandable to accommodate motorcycle tires having a bead diameter of 16 inches or 16.5 inches or 17 inches.

* * * * *